United States Patent [19]

Wiest et al.

[11] 4,205,161

[45] May 27, 1980

[54] PROCESS FOR REDUCING CONTENT OF FREE VINYL CHLORIDE BY POSTTREATING COPOLYMER WITH REDOX CATALYST

[75] Inventors: Hubert Wiest; Peter Ludwig; Klaus Häfener; Erwin Lieb, all of Burghausen, Fed. Rep. of Germany

[73] Assignee: Wacker-Chemie GmbH, Munich, Fed. Rep. of Germany

[21] Appl. No.: 858,206

[22] Filed: Dec. 7, 1977

[30] Foreign Application Priority Data

Jan. 13, 1977 [DE] Fed. Rep. of Germany ....... 2701147

[51] Int. Cl.² ............................ C08F 6/24; C08F 6/16
[52] U.S. Cl. ............................ 528/487; 260/29.6 PT; 526/93; 526/200; 526/209; 526/216; 526/225; 526/264; 526/287; 526/304; 526/317; 526/318; 526/320; 526/323; 526/329; 526/330; 526/331; 528/501; 528/503
[58] Field of Search ....................... 528/491, 503, 487

[56] References Cited

U.S. PATENT DOCUMENTS 3,692,726  9/1972  Oehmichen ..................... 260/29.6 R
4,015,065  3/1977  Park ..................................... 528/503

*Primary Examiner*—C. A. Henderson
*Attorney, Agent, or Firm*—Hammond & Littell, Weissenberger & Muserlian

[57] ABSTRACT

A process for the manufacture of vinyl chloride copolymers having a reduced content of free vinyl chloride comprising polymerizing a monomer mixture containing from 15% to 90% by weight of vinyl chloride under aqueous emulsion polymerization conditions with conventional post-polymerization, releasing the pressure, flushing the gas space above the copolymer dispersion free of monomer, cooling the copolymer dispersion to a temperature of from 10° to 40° C., adding a redox catalyst to the cooled dispersion consisting of from 0.002% to 0.5% by weight of the dispersion of an oil-soluble peroxy compound, and a water-soluble sulfur-containing reducing agent in a ratio of reducing agent to peroxy compound of 0.5 to 3 equivalents, allowing the dispersion to stand at a temperature of from 10° to 40° C. for a period of two hours to two days and recovering a copolymer dispersion having a vinyl chloride content of less than 50 ppm.

6 Claims, No Drawings

PROCESS FOR REDUCING CONTENT OF FREE VINYL CHLORIDE BY POSTTREATING COPOLYMER WITH REDOX CATALYST

BACKGROUND OF THE INVENTION

Aqueous vinyl chloride copolymer dispersions are of considerable commercial importance in their use as coatings, binders and adhesives. New knowledge regarding work hygiene, however, requires that it is necessary to remove monomeric vinyl chloride from the polymer dispersions. Processes known for this purpose have in the last consequence comprised flushing the polymer dispersion free of monomer. All of these processes suffer from the deficiency of requiring a high energy expenditure, and from the risk of a change in the dispersions, such as agglomeration, skin formation and deposit on the walls of the vessel. In addition to the considerable amount of time required for this process, there are difficulties in recovering the vinyl chloride monomer from the exhaust gases.

OBJECTS OF THE INVENTION

An object of the present invention is to provide a method for the removal of vinyl chloride from the copolymer dispersion that consumes less energy, spares the polymer dispersion thermally and mechanically and restricts the degasification of monomeric vinyl chloride to a minimum degree but at the same time significantly reduces the concentration of vinyl chloride in the polymer.

Another object of the present invention is the development of a process for the production of vinyl chloride copolymer dispersions having a reduced content of free vinyl chloride comprising the steps of polymerizing a monomer mixture containing from 15% to 90% by weight of vinyl chloride and the remainder, monomers, copolymerizable with vinyl chloride, under aqueous emulsion polymerization conditions at temperatures of 30° C. to 80° C., in the presence of 0.1% to 10% by weight of emulsifiers and/or 0.1% to 5% by weight of protective colloids, as well as from 0.05% to 2% by weight of free-radical-former polymerization catalysts, all based on the polymerization product, post-polymerizing until a decrease in the autogeneous pressure occurs, releasing the pressure, flushing the gas space above the copolymer dispersion free of monomer, cooling the copolymer dispersion by at least 10° C. to 40° C. to a temperature of from 10° C. to 40° C., adding a redox catalyst to the cooled dispersion consisting of from 0.002% to 0.5% by weight of the dispersion, of an oil-soluble peroxy compound, and a water-soluble sulfur-containing reducing agent in a ratio of reducing agent to peroxy compound of 0.5 to 3 equivalents, allowing the dispersion to stand at a temperature of from 10° C. to 40° C. for a period of two hours to two days and recovering a copolymer dispersion having a vinyl chloride content of less than 50 ppm.

These and other objects of the invention will become more apparent as the description thereof proceeds.

DESCRIPTION OF THE INVENTION

The subject of the invention is a process for the manufacture in aqueous emulsion, at temperatures of 30° to 80° C. at elevated pressure, of vinyl chloride copolymers with a low residual monomer content in the presence of 0.1% to 10% by weight of emulsifiers and/or 0.1% to 5% by weight of protective colloids, 0.05% to 2% by weight of free-radical-forming substances, in each case calculated on the polymerization product, characterized in that after a fall in pressure caused by the post-polymerization, the pressure in the autoclave is released, the gas space above the polymerization dispersion is flushed free of monomer, the dispersion is cooled by at least 10° C. to 40° C., to a temperature of between 10° C. and 40° C and at this temperature redox catalysts, consisting of oil-soluble peroxy compounds, in quantities of 0.002 to 0.5% by weight, preferably 0.01 to 0.1% by weight, calculated on the dispersion, as well as a water-soluble sulfur-containing reducing agent are added to a ratio of reducing agent to peroxy compound of 0.5 to 3 equivalents, and the mixture is allowed to stand for two hours to two days.

More particularly, the present invention relates to a process for the production of vinyl chloride copolymer dispersions having a reduced content of free vinyl chloride comprising the steps of polymerizing a monomer mixture containing from 15% to 90% by weight of vinyl chloride and the remainder, monomers copolymerizable with vinyl chloride, under aqueous emulsion polymerization conditions at temperatures of 30° C. to 80° C., in the presence of 0.1% to 10% by weight of emulsifiers and/or 0.1% to 5% by weight of protective colloids, as well as from 0.05% to 2% by weight of free-radical-former polymerization catalysts, all based on the polymerization product, post-polymerizing until a decrease in the autogeneous pressure occurs, releasing the pressure, flushing the gas space above the copolymer dispersion free of monomer, cooling the copolymer dispersion by at least 10° C. to 40° C., to a temperature of from 10° C. to 40° C., adding a redox catalyst to the cooled dispersion consisting of from 0.002% to 0.5% by weight of the dispersion, of an oil-soluble peroxy compound, and a water-soluble sulfur-containing reducing agent in a ratio of reducing agent to peroxy compound of 0.5 to 3 equivalents, allowing the dispersion to stand at a temperature of from 10° C. to 40° C. for a period of two hours to two days and recovering a copolymer dispersion having a vinyl chloride content of less than 50 ppm.

The vinyl chloride copolymers preferably used are those that are produced by the copolymerization of vinyl chloride with ethylene and/or vinyl acetate. A preferred catalyst system for the reduction of vinyl chloride is the combination of tert.-butyl hydroperoxide with sodium sulfite and/or sodium formaldehydesulfoxylate.

Surprisingly, the residual vinyl chloride concentration drops, without further processing or stirring, in the course of a few hours to two days, to less than 50 ppm, usually less than 20 ppm. In many cases the residual vinyl chloride content is less than 1 ppm and is, therefore, below the limit of detection. The process according to the invention avoids contamination of the environment by the emission of vinyl chloride, since the vinyl chloride remaining in the gas space of the reactor at the end of the polymerization process can be condensed and recovered after releasing the pressure and/or pulling a vacuum, whereas the vinyl chloride in the water and especially that remaining dissolved in the polymer, which can only effectively be removed by time-consuming desorption processes, is converted into the polymer. The removal by polymerization of the residual vinyl chloride at a lowered temperature is all the more surprising since the customary process for the removal of the residual monomer comprises the subsequent addition of catalyst and increasing the temperature towards the end of the polymerization process without, as in the process according to the invention, the residual vinyl chloride content being reduced to the same effect.

The vinyl chloride copolymers that come into consideration are those containing from 15% to 90% by weight, preferably 20% to 80% by weight, of vinyl chloride. The comonomers that come into consideration are monomers copolymerizable with vinyl chloride, such as vinyl esters of the straight-chain and branched carboxylic acids having from 1 to 18 carbon atoms, such as vinyl alkanoates having 1 to 18 carbon atoms, in the alkanoate, for example, vinyl acetate, vinyl propionate, vinyl butyrate, vinyl pivalate, vinyl 2-ethylhexoate, vinyl isononate, vinyl stearate, vinyl laurate, and vinyl Versatate ®. Mixtures of different vinyl esters can also be used. Preferably vinyl acetate is used.

It is also possible to use as comonomers acrylic acid or methacrylic acid esters of aliphatic alcohols or alkanols having from 1 to 8 carbon atoms, or the corresponding diesters of maleic acid, fumaric acid, and itaconic acid. Further comonomers that can be used are lower olefins, for example, ethylene or propylene. Mixtures of the said comonomers can also be used. It is possible to co-use as further comonomers, in quantities of up to 5% by weight, the monoolefinically-unsaturated compounds having functional groups, such as (meth)acrylic acid, crotonic acid, the amides of these acids and their N-methylol compounds, alkenedioic acids having 4 to 8 carbon atoms, such as maleic acid, fumaric acid and itaconic acid and their half esters with alkanols having from 1 to 8 carbon atoms, salts of vinylsulfonic acid, vinylpyrrolidone and N-vinylacetamide, hydroxyethyl (meth)acrylate and hydroxypropyl (meth)acrylate. Polyolefinically-unsaturated comonomers, such as triallyl cyanurate, diallyl adipate, vinyl crotonate, ethylene glycol di(meth)acrylate, butanediol di(meth)acrylate or allyl (meth)acrylate can be co-used in amounts of up to 2% by weight.

The polymerization is carried out in aqueous medium in pressure autoclaves. The weight ratio of water to monomers can vary from 40:60 to 80:20. The aqueous dispersion phase may contain known emulsifying agents or dispersing auxiliaries, such as, for example, ionic or nonionic emulsifiers and/or protective colloids, as described in detail, for example, in Houben-Weyl "Methoden der organischen Chemie", Vol. XIV/1, "Makromolekulare Stoffe", Georg Thieme-Verlag, Stuttgart, 1961, pp. 192 to 208. Generally, the emulsifiers are added in quantities of from 0 to 10% by weight and the protective colloids in quantities of from 0 to 5% by weight, with a minimum of 0.1% of at least one of the emulsifiers or protective colloids. Preferably emulsifier quantities of between 0.5% to 6% by weight and protective colloid quantities of from 0.3% to 5% by weight are used. All percentages are based on the polymerization product.

The free-radical-former initiators or polymerization catalysts are generally added in quantities of between 0.05% to 2% by weight, likewise based on the polymerization product. As water-soluble free-radical-forming polymerization catalysts, there come into consideration chiefly the alkali metal persulfates, such as potassium, sodium persulfates, and ammonium persulfate, hydrogen peroxide, tert.-butyl hydroperoxide, azo compound, such as azoisobutyric acid nitrile, as well as alkali metal perborates and customary redox catalyst systems, such as, for example, potassium persulfate/hydrogen/palladium sol/ferrous ammonium sulfate or alkali metal persulfate/sodium formaldehydesulfoxylate. Furthermore, customary charge transfer agents and buffer systems can optionally be used in quantities of from 0.1% to 3% by weight.

The polymerization process is generally carried out in that an aqueous solution of emulsifiers and/or protective colloids together with the monomer is prepared. It is also possible to meter in the monomer, continuously or semi-continuously, during the course of the polymerization process. Generally the operation is carried out under autogenous vinyl chloride pressure. In the presence of ethylene, polymerization is effected at pressures of between 5 and 100 bars. The pressure depends on the amount of ethylene that is to be added by polymerization.

The polymerization process is started by heating the polymerization mixture and adding catalyst. After adding the total amount of monomer and once the pressure has dropped, further catalyst is generally added until the reaction stops. For this post-polymerization step, the temperature of the polymerization mixture may be further increased. Generally, the polymerization process is practically complete after a post-polymerization time of from one to two hours. The pressure in the autoclave is then relased and the monomeric vinyl chloride in the gas space is flushed out. This can be effected by passing an inert gas over the polymerization dispersion, flushing, or briefly evacuating. The dispersion is then cooled by at least 10° C. to 40° C. to a temperature of between 10° C. and 40° C.

In two further process steps, a solution of an oil-soluble peroxide and a solution of the salt of a sulfur-containing reducing acid are added respectively. It is likewise possible first of all to cool the dispersion and to add the redox catalyst system for the after post-polymerization, and then to remove the monomeric vinyl chloride from the gas space. The after post-polymerization which now occurs reduces the residual content of vinyl chloride that is dissolved in the aqueous system or in the particles of polymer to less than 50 ppm, preferably less than 20 ppm, without further stirring and temperature control, within a period of two hours to two days.

As oil-soluble peroxy compounds of the process step of the invention, preferably tert.-butyl hydroperoxide is used. It is also possible to use compounds such as di-tert.-butyl peroxide, cumene hydroperoxide, acetyl peroxide, benzoyl peroxide, lauryl peroxide, tert.-butyl peroxopivalate, acetylcyclohexanesulfonyl peroxide, acetyl peroxocarbonate and dialkyl peroxodicarbonate, for example, diisopropyl peroxodicarbonate, etc. The peroxy compounds are dissolved in a solvent that is water-miscible, when using tert.-butyl hydroperoxide, for example, methanol.

The salt of a sulfur-containing reducing acid employed is preferably the water-soluble alkali metal and alkaline earth metal salts of such acids in which the sulfur has oxidation states of between 2 and 5, such as, for example, sulfoxyl acid, thiosulfuric acid, dithiosulfurous acid, sulfurous acid and hydrogen sulfurous acid. Preferably, sodium formaldehydesulfoxylate and sodium sulfite are used.

The concentration of oxidizing agent and reducing agent used is in each case between 0.002% and 0.5%, preferably between 0.01% and 0.1% by weight, calculated on the dispersion. The equivalent ratio of reducing agent to oxidizing agent may be above or below 1. It is preferably between 0.5 and 3 equivalents.

The after post-polymerization of the invention is generally carried out in a weakly acid medium at a pH of between 2.5 and 7.

The following examples are illustrative of the practice of the invention without being limitative in any manner.

EXAMPLE 1

A pressure reactor of 18 liters capacity provided with agitator, heating and cooling devices, and proportionating feed equipment was employed. 6400 ml of water were added to the reactor. 85 gm of the sodium salt of a lauryl ethoxy ether sulfate with 3 mols of ethylene oxide, 25 gm of sodium vinyl sulfonate and 70 gm of potassium persulfate were dissolved therein while stirring, and the reactor was freed of atmospheric oxygen by flushing with nitrogen. Then, 900 gm of a monomer mixture consisting of 4500 gm of vinyl chloride and 1900 gm of vinyl acetate were added. The reaction mixture was heated to 45° C. and simultaneously ethylene was introduced until a total pressure of 50 bars at 50° C. was attained.

The polymerization process was commenced by continuously metering in a solution of 30 gm of sodium formaldehydesulfoxylate in 700 ml of water. The process started after approximately 50 ml of solution had been added. Fifteen minutes after the beginning of the reaction the remaining monomer mixture was proportioned in over a period of six hours, and also a solution consisting of 60 gm of acrylic acid, 60 gm of methacrylamide and 20 gm of vinyl sulfonate, as well as, in addition, the sodium formaldehydesulfoxylate solution, were fed in. The ethylene pressure was maintained at 50 bars and the temperature at 50° C. until all of the monomer mixture had been added. Subsequently a further 10 gm of persulfate as a 3% aqueous solution was added and the remaining sodium formaldehydesulfoxylate solution was fed in over one hour.

The pH value was then adjusted to 4 by the addition of ammonia. The reaction mixture was transferred by expansion of the pressure into a 30-liter vessel and cooled to 25° C. The gas mixture was removed from the space above the reaction mixture by pulling a vacuum for approximately fifteen minutes and the resulting reduced pressure was broken by nitrogen. A 51% solids shear-stable dispersion with an average particle size of 0.18 μm which had a residual monomer content of vinyl chloride of 270 ppm, was obtained.

A solution of 3.5 gm of tert.-butyl hydroperoxide in a solvent mixture of 50 ml of methanol and 50 ml of water was then added to the cooled dispersion while stirring. Then 3 gm of sodium sulfite in 100 ml of water were added thereto and the dispersion was left to stand without further stirring. After standing for three hours, the content of vinyl chloride was only 2.6 ppm, and after standing for one day, a content of only 1.6 ppm was obtained.

COMPARISON EXAMPLE 1

The procedure was as in Example 1, except that the subsequently added catalyst components were metered into the reactor before releasing the pressure and the reaction was maintained at 50° C. for a further six hours. After releasing the pressure and pulling a vacuum in the gas space, the residual monomer content in the dispersion was 100 ppm of vinyl chloride.

EXAMPLE 2

The procedure as in Example 1 was followed except that a monomer mixture consisting of 2500 gm of vinyl chloride, 2500 gm of vinyl acetate, and 1250 gm of methyl methacrylate was used. The ethylene pressure was again maintained at 50 bars. After pulling a vacuum in the gas space and releasing the same, the dispersion contained 600 ppm of vinyl chloride. 5 gm of tert.-butyl hydroperoxide in 50 ml of methanol and 50 ml of water were stirred into the dispersion which had been cooled to 20° C. and subsequently 5 gm of sodium formaldehydesulfoxylate solution in 100 ml of water were added. After standing for three hours, the residual monomer content of vinyl chloride in the dispersion had dropped to 16 ppm, and after one day to 8 ppm.

EXAMPLE 3

The following are placed in a pressure vessel having a capacity of 16 liters equipped with heating and cooling devices as well as proportioning feed means:

5450 ml of water,
1050 ml of a 25% aqueous solution of nonylphenol polyethyleneglycol ether,
35 ml of a 30% aqueous solution of a paraffinsulfonate, and approximately
3 ml of formic acid in order to establish a pH value of approximately 3.0.

The agitator was started. The vessel was evacuated and subsequently 750 gm of vinyl acetate and 320 gm of vinyl chloride were introduced and emulsified.

The contents of the autoclave were then heated to 45° C. and simultaneously ethylene was introduced until a pressure of 40 bars was reached. The polymerization was started by metering in the catalyst system comprising a single dose of:

20.0 ml of Pd sol (0.1% in water),
0.3 gm of ferrous ammonium sulfate dissolved in 5 ml of water,
10.0 Nl of hydrogen, and a 3% solution of potassium persulfate in water.

The potassium persulfate solution was continuously further metered in at a rate of 60 to 80 ml/hour. Immediately after polymerization commenced, 4185 gm of vinyl acetate and 1790 gm of vinyl chloride were added to the reaction mixture at feed rates of approximately 1050 ml/hour and 450 ml/hour, respectively, as well as a solution of 70 ml of acrylic acid in 480 ml of water at approximately 100 ml/hour. The temperature was held constant at 45° C. by the heating and cooling system, and the pressure was held at 40 bars by introducing ethylene.

As soon as a solids content of 50% was reached, that is, approximately nine hours after the beginning of the polymerization process, 30 ml of an antifoaming solution were added and the mixture was transferred off into a larger agitator vessel and the gaseous residual monomer was removed by brief evacuation and purging with nitrogen.

The mixture was then cooled to approximately 30° C., and first of all a solution of 7.5 gm of tert.-butyl hydroperoxide in 30 ml of methanol and 30 ml of water was stirred in. Then, after about fifteen minutes, a solution of 7.5 gm of sodium formaldehydesulfoxylate in 60 ml of water was stirred in.

The analyses showed that before the addition of the catalyst system according to the invention the dispersion had a residual monomer content of 230 ppm of vinyl chloride. Twenty-four hours later the vinyl chloride content in a sample of the dispersion, which had not been treated further, was 210 ppm, but in the mixture treated according to the invention, it had dropped to 2.2 ppm of vinyl chloride.

COMPARISON EXAMPLE 3

First of all, the procedure as in Example 3 was followed, but after reaching a solids content of 50% the metering in of the persulfate solution was continued for a further five hours at 60 to 80 ml/hour, while stirring, at a temperature of 45° C. After drawing off and evacuating the charge, the residual monomer content found in the dispersion was 90 ppm of vinyl chloride.

EXAMPLE 4

The following were placed in the apparatus of Example 3:
1240 ml of water,
4500 ml of a solution of 3.3% of hydroxyethylcellulose in water,
560 ml of a solution of 25% of nonylphenol polyethyleneglycol ether in water.
The agitator was started. The vessel was evacuated and heated to 45° C. and simultaneously ethylene was introduced until a pressure of 45 bars was reached. The following were then metered in, in succession:
880.0 gm of vinyl acetate
380.0 gm of vinyl chloride
20.0 ml of Pd sol (0.1% in water)
0.2 gm of ferrous ammonium sulfate in 5 ml of water, and
10.0 Nl of hydrogen, as well as
75.0 ml of a 3% potassium persulfate solution in water.

After polymerization has commenced, 3500 gm of vinyl acetate and 1500 gm of vinyl chloride were dosed in at feed rates of approximately 670 and 290 ml/hour, respectively, and 30 to 45 ml/hour of 3% persulfate solution were added continuously. While the monomer was metered in, the temperature was held constant at 45° C. and the pressure at 45 bars by introducing ethylene. When the addition of monomer was completed, the mixture was heated to 55° C. to accelerate the reaction.

The procedure was then as in Example 3, except the quantities of catalyst constituents of the invention were only 3 gm in each case instead of 7.5 gm.

The dispersion obtained had residual monomer contents of 3 ppm of vinyl chloride after standing 24 hours.

COMPARISON EXAMPLE 4

The procedure as in Comparison Example 3 was followed. In spite of a three-hour post-evacuation, a dispersion having residual monomer contents of 110 ppm of vinyl chloride was obtained.

EXAMPLE 5

The following are placed in a pressure apparatus corresponding to that in Example 3 with a 7 liter capacity:
3000 ml of water,
125 ml of a 30% solution of a paraffin-sulfonate in water,
250 ml of a 40% solution of a tridecanol ethoxylate ethoxylated with 15 mols of ethylene oxide in water,
30 gm of trisodium phosphate,
9 gm of potassium persulfate.

The agitator was started. The vessel was evacuated and subsequently 380 gm of vinyl acetate and 260 gm of vinyl chloride were introduced and emulsified.

The polymerization process was started by heating to 50° C. and this temperature was maintained by means of the heating/cooling cycle. Three hours later, approximately 90 ml/hour of vinyl acetate and approximately 175 ml/hour of vinyl chloride were dosed in continuously until a total of 900 gm of vinyl acetate and 1675 gm of vinyl chloride was reached. As soon as, subsequently, the excess pressure had dropped, the temperature was raised to 80° C. and this temperature was maintained for one hour. The mixture was then cooled to 30° C. and a sample was taken. The sample was a stable dispersion with a solids content of approximately 47% and a residual monomer content of 250 ppm of vinyl chloride. After 24 hours of standing, the vinyl chloride content dropped to 220 ppm and after two weeks to 180 ppm.

A solution of 4 gm of tert.-butyl hydroperoxide in a solution of 20 ml each of water and methanol was stirred into the mixture and then, approximately fifteen minutes later, a solution of 4 gm of Na formaldehydesulfoxylate in 20 ml of water was stirred in. After 24 hours of standing, the dispersion contained only 18 ppm of vinyl chloride.

COMPARISON EXAMPLE 5

The procedure as in Example 5 was followed, except that a solution of 10 gm of ammonium persulfate in 50 ml of water was stirred into the dispersion, which had been cooled to 30° C., and after 15 minutes a solution of 4 gm of Na formaldehydesulfoxylate in 20 ml of water was added. After 24 hours, the dispersion still contains 130 ppm of vinyl chloride. This demonstrates the criticality of employing an oil-soluble peroxy compound in the process of the invention.

It is evident from the Examples and the Comparison Examples that the feature according to the invention, which actually follows the termination of the polymerization process, is not, as shown above, a comparatively ineffective subsequent addition of catalyst, but that the concentration of vinyl chloride monomer can be reduced effectively only under the processing conditions of the invention.

The preceding specific embodiments are illustrative of the practice of the invention. It is to be understood, however, that other expedients known to those skilled in the art disclosed herein, may be employed without departing from the spirit of the invention or the scope of the appended claims.

We claim:

1. A process for the production of vinyl chloride copolymer dispersions having a reduced content of free vinyl chloride comprising the steps of polymerizing a monomer mixture containing from 15% to 90% by weight of vinyl chloride and the remainder, mono-olefinically unsaturated monomers copolymerizable with vinyl chloride selected from the group consisting of vinyl alkanoates having from 1 to 18 carbon atoms in the alkanoate, esters of alkanols having from 1 to 8 carbon atoms with acrylic acid and methacrylic acid, diesters of alkanols having from 1 to 8 carbon atoms with maleic acid, fumaric acid and itaconic acid, ethylene, propylene and mixtures thereof, with from 0 to 5% of the monomer mixture, mono-olefinically-unsaturated monomers copolymerizable with vinyl chloride and having functional groups and from 0 to 2% of the monomer mixture, poly-olefinically-unsaturated monomers copolymerizable with vinyl chloride, under aqueous emulsion polymerization conditions at temperatures of 30° C., to 80° C., in the presence of from 0 to 10% by weight of emulsifiers and from 0 to 5% by weight of protective colloids, with a minimum of 0.1% of at least one of said emulsifiers and said protective colloids, as well as from 0.05% to 2% by weight of free-radical-former polymerization catalysts, all based on the polymerization product, post-polymerizing until a decrease in the autogeneous pressure occurs, releasing the pressure, flushing the gas space above the copolymer dispersion free of monomer, cooling the copolymer dispersion by at least 10° C. to 40° C., to a temperature of from 10° C. to 40° C., said cooled copolymer dispersion having a vinyl chloride content of over 50 ppm, adding a redox catalyst to the cooled dispersion consisting of from 0.002% to 0.5% by weight of the dispersion, of an oil-soluble peroxy compound, and a water-soluble sulfur-containing reducing agent in a ratio of reducing agent to peroxy compound of 0.5 to 3 equivalents, allowing the dispersion to stand at a temperature of from 10° C. to 40° C. for a period of two hours to two days and recovering a copolymer dispersion having a vinyl chloride content of less than 50 ppm.

2. The process of claim 1 wherein the amount of vinyl chloride in said monomer mixture is from 20% to 80% by weight.

3. The process of claim 1 wherein said monomers copolymerizable with vinyl chloride are members selected from the group consisting of vinyl acetate, ethylene and mixtures thereof.

4. The process of claim 1 wherein from 0.1% to 0.1% by weight of the dispersion of said oil-soluble peroxy compound is employed.

5. The process of claim 1 wherein said oil-soluble peroxy compound is tert.-butyl hydroperoxide and said water-soluble sulfur-containing reducing agent is a member selected from the group consisting of sodium sulfite, sodium formaldehydesulfoxylate and mixtures thereof.

6. The process of claim 1 wherein said cooled copolymer dispersion before adding said redox catalyst has a content of from 230 to 600 ppm of vinyl chloride.

* * * * *

UNITED STATES PATENT AND TRADEMARK OFFICE
CERTIFICATE OF CORRECTION

PATENT NO. : 4,205,161

DATED : May 27, 1980

INVENTOR(S) : Hubert Wiest et al

It is certified that error appears in the above—identified patent and that said Letters Patent is hereby corrected as shown below:

Column 10, line 10, Claim 4, lines 1 and 2, "0.1% to 0.1%" should be -- 0.01% to 0.1% --.

Signed and Sealed this

Twenth-eighth Day of September 1982

[SEAL]

Attest:

GERALD J. MOSSINGHOFF

Attesting Officer

Commissioner of Patents and Trademarks